Oct. 13, 1942. W. C. RICHARDSON Re. 22,200

HYDRAULIC CONTINUOUS PRESS

Original Filed March 26, 1935 4 Sheets-Sheet 1

Inventor

William C. Richardson

By Clarence A. O'Brien

Attorney

Oct. 13, 1942. W. C. RICHARDSON Re. 22,200

HYDRAULIC CONTINUOUS PRESS

Original Filed March 26, 1935 4 Sheets-Sheet 2

Inventor

William C. Richardson

By Clarence A. O'Brien.

Attorney

Oct. 13, 1942. W. C. RICHARDSON Re. 22,200
HYDRAULIC CONTINUOUS PRESS
Original Filed March 26, 1935 4 Sheets-Sheet 3
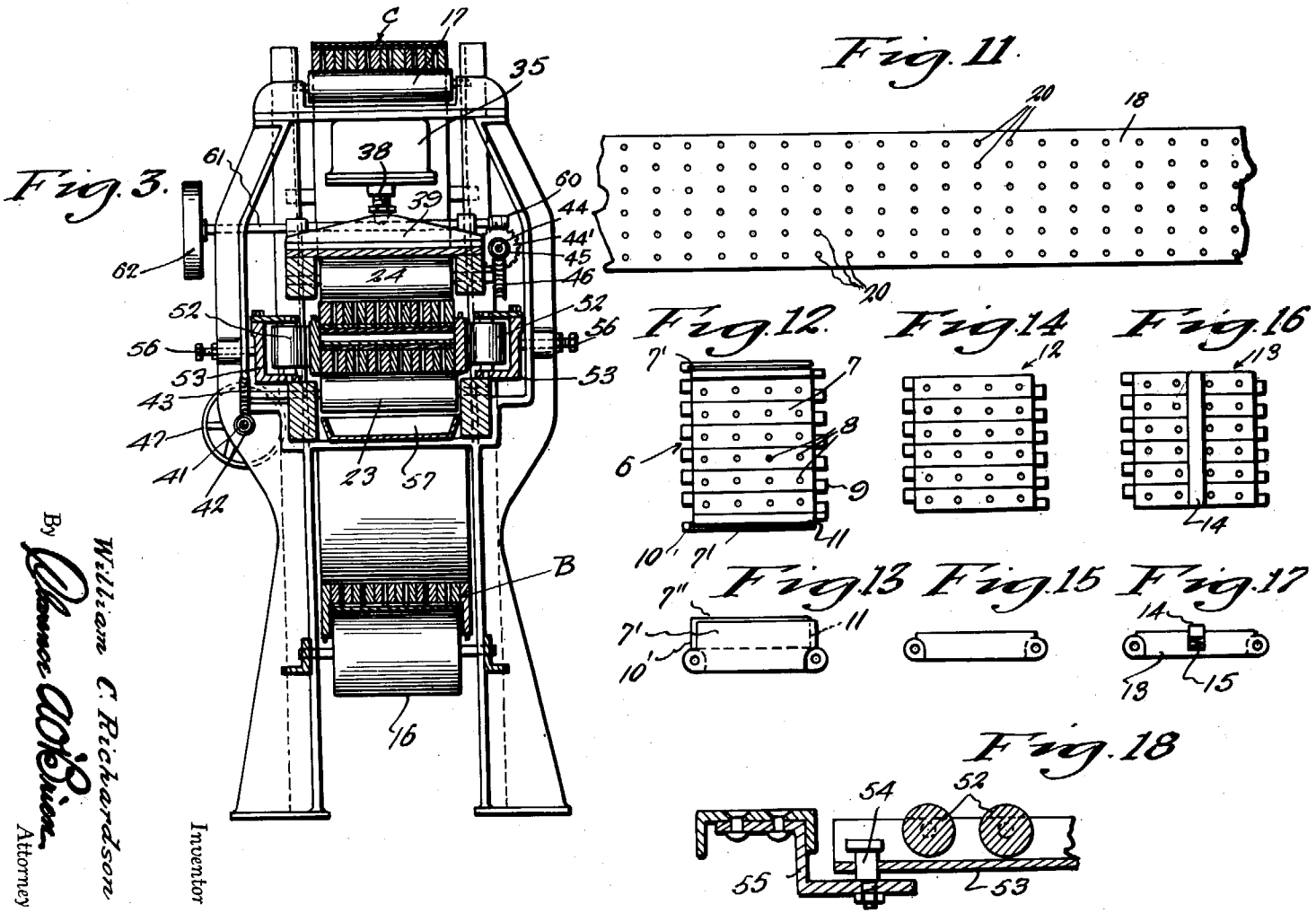
Inventor
William C. Richardson
By Clarence A. O'Brien
Attorney Oct. 13, 1942. W. C. RICHARDSON Re. 22,200
HYDRAULIC CONTINUOUS PRESS
Original Filed March 26, 1935 4 Sheets-Sheet 4
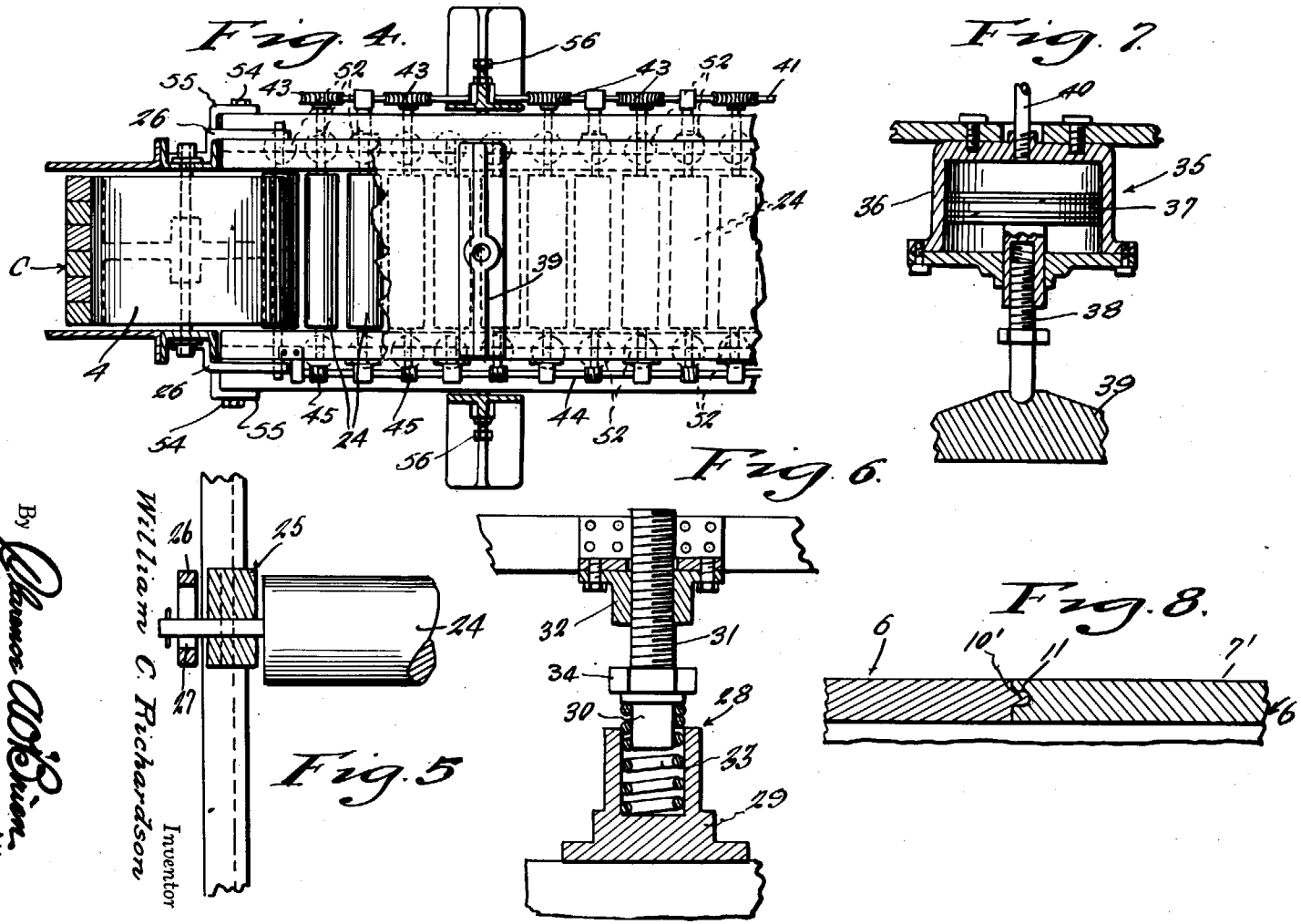
Inventor
William C. Richardson
By Clarence A. O'Brien
Attorney Reissued Oct. 13, 1942

Re. 22,200

UNITED STATES PATENT OFFICE 22,200

HYDRAULIC CONTINUOUS PRESS

William C. Richardson, Wilbarger County, Tex.

Original No. 2,057,312, dated October 13, 1936, Serial No. 13,179, March 26, 1935. Application for reissue October 12, 1938, Serial No. 234,721

9 Claims. (Cl. 100—35)

This invention relates to a continuous press utilizing fluid means to obtain the principal pressing action.

The general object of the invention is to provide upper and lower chains of the endless type, means for feeding the material to be pressed between the lower reach or stretch of the upper chain and the upper reach or stretch of the lower chain and applying pressure to the links of lower stretch or reach of the upper chain whereby the material will be pressed between the upper reach of the lower chain and the lower reach of the upper chain.

Another object of the invention is to so form the links of the lower chain that they will form a trough for the material being pressed by the upper chain and to provide an endless steel belt having perforations therein for registering with the perforations in the links of the chains and an endless strip of press cloth engaging the outer surface of the steel belt.

Another object of the invention is to subject the material at the front of the press to the pressure of a spring ram, after which the material is subjected to the pressure of hydraulic rams.

Yet another object of the invention is to provide supporting rolls for the upper reach of the lower chain and pressure rolls for the lower reach of the upper chain, the latter rolls being carried by a frame which is engaged by the rams.

A still further object of the invention is to provide adjustable side rollers for engaging the sides of the links which form the trough.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 3 is a section on the line 3—3 of Fig. 1.

Fig. 4 is a fragmentary top plan view with parts omitted and parts in section.

Fig. 5 is a section on the line 5—5 of Fig. 2.

Fig. 6 is a section on the line 6—6 of Figure 1 with parts shown in elevation.

Fig. 7 is a section on the line 7—7 of Fig. 2 with parts shown in elevation.

Fig. 8 is a fragmentary sectional view on the line 8—8 of Fig. 2.

Fig. 11 is a fragmentary top plan view of the steel belt.

Fig. 12 is a top plan view of one of the links of the lower chain.

Fig. 13 is a side view of said chain.

Fig. 14 is a top plan view of the link of the upper chain.

Fig. 15 is a side view of said link.

Fig. 16 is a plan view of a link provided with a cutter.

Fig. 17 is a side view of said link.

Fig. 18 is a section on the line 18—18 of Fig. 1.

Figures 1, 9, 10:
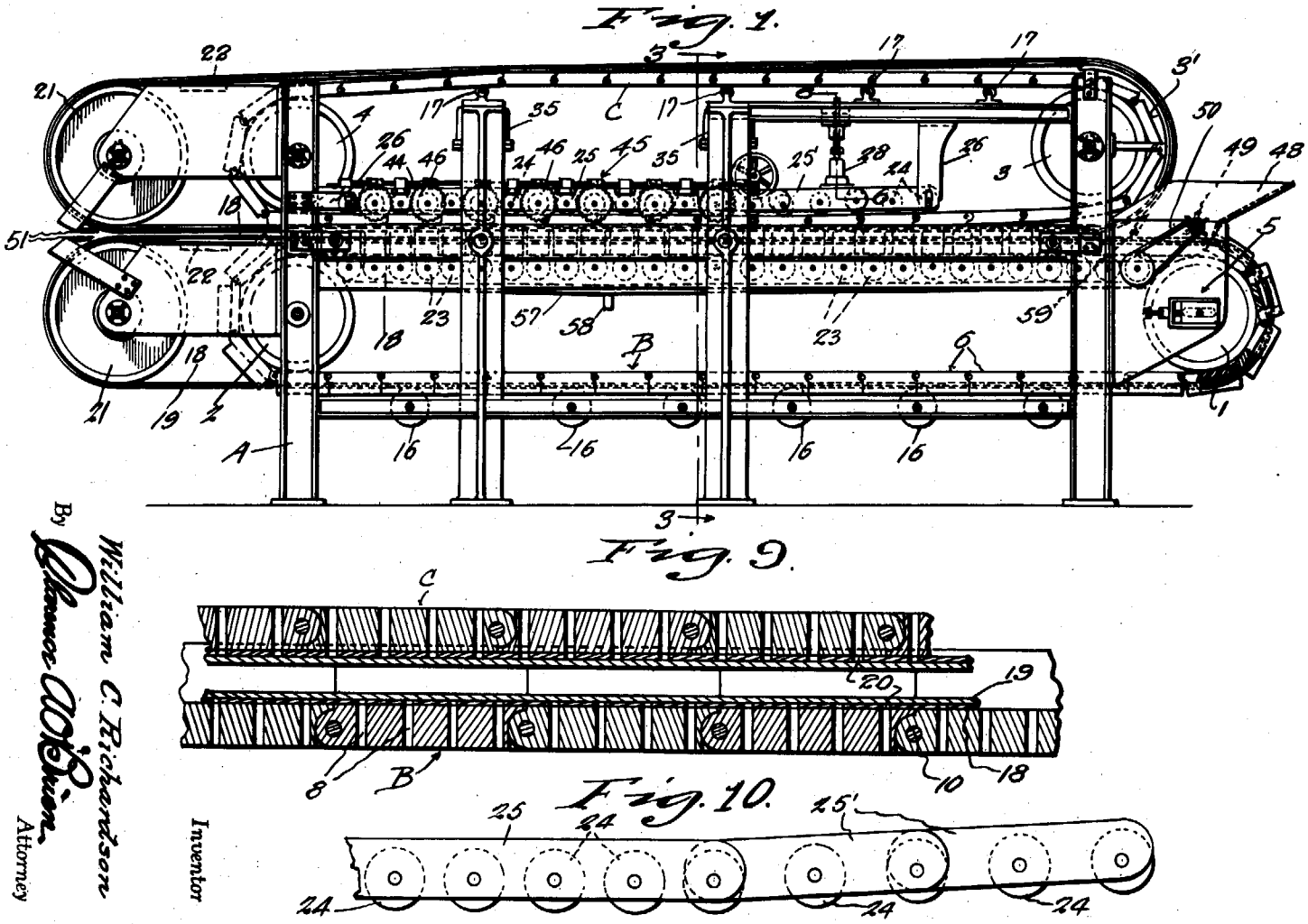
Fig. 1 is an elevation of the apparatus.
Fig. 9 is a fragmentary vertical sectional view through the adjacent reaches of the upper and lower chains.
Fig. 10 is a side view of the front end portion of the frame which carries the pressure rollers engaged by the rams.

In the drawings the letter A indicates an upright supporting frame upon which front and rear drums 1 and 2 are rotatably mounted. The lower chain B passes around drums 1 and 2 as is most clearly illustrated in Fig. 1.

The drums 3 and 4 are rotatably mounted in uprights A substantially above drums 1 and 2; these drums 3 and 4 have an upper chain C passing therearound for pressing action against the lower chain B. The drums are preferably mounted on pintles, and one drum of the lower pair 1 and 2 and one drum of the upper pair 3 and 4 have their pintles carried by an adjustable bearing means shown generally at 5 for the front drum 1, as shown in Fig. 1, so that the tension of each of the chains can be adjusted. The links 6 of the lower chain are each formed of a plurality of longitudinally extending bars 7 having perforations therein and provided with perforated ears 9 at their ends which receive the pivot pins 10 which pivotally connect the links together as shown more particularly in Fig. 9, and each of these links 6, as shown in Figs. 12 and 13, has bars 7′ of considerable height at their sides so that each link is of substantially trough shape, the side bars 7′ forming the sides of the trough. One end of each bar 7′ is formed with a tongue 10′ for fitting into groove 11 of the next link and a tongue 7″ is formed on the upper or free edge of each bar 7′.

Each link 12 of the upper chain is formed in substantially the same manner as a link of the lower chain, except that these links 12 are not provided with high side bars 7′ as are the links of the lower chain. The links 12 of chain C, when pressed downward, interfit between the side bars 7' of the links of the lower chain B. A link of the upper chain is shown in Figures 14 and 15.

Fig. 16 and 17 show a link 13 made in substantially the same manner as the link 12, excepting that a transverse groove is formed in one face of the link for receiving a cutter bar 14 which is pressed outwardly by a spring 15 in the groove. These links 13 can be substituted for the links 12 when desired.

Figure 2:
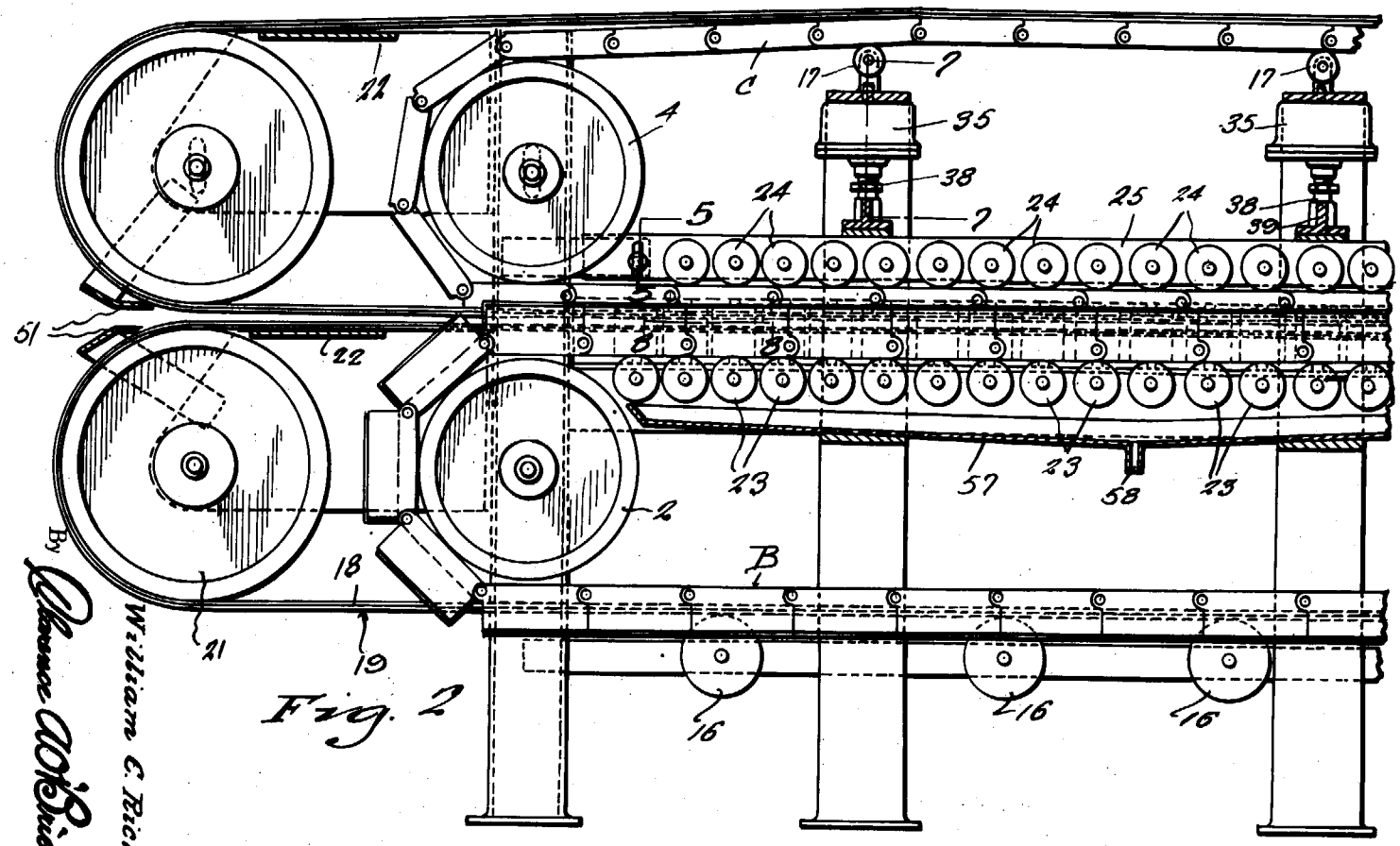
Fig. 2 is an elevation with parts in section of the discharging end of the apparatus.

The lower reach of the lower chain is supported by the rollers 16 and the upper reach of the upper chain is supported by the rollers 17 as shown in Figs. 1 and 2.

An endless steel belt 18 and an endless strip of cloth or fabric 19 are provided for the lower chain B and an endless strip of cloth or fabric 19 and an endless steel belt 18 are provided for upper chain C, as well as for the lower chain B. The fabric strip 19 contacts the outer face of the steel belt 18; said steel belt 18 is provided with perforations 20 which register with the perforations of the links, as shown in Fig. 9, and a portion of the steel belt is shown in Fig. 11.

The material to be pressed may contain liquid in varying quantities and it is desirable to remove this liquid from the solid, therefore fibrous strip 19 is provided to cover perforated steel belt 18 which permits the extracted liquid to pass through fibrous strip 19, perforated steel belt 18 and into a receiving pan, leaving the solids disposed between the fibrous strips 19 to be conveyed to the discharge end of the machine. The chain B has a steel belt 18 and fibrous strip 19 disposed therearound and passing over a lower drum 21; in a similar manner the chain C is provided with a steel belt 18 and fibrous strip 19 which passes over upper drum 21 at the discharge end of the machine. The lower endless belt 18 and fibrous strip 19 simply pass over the links of the chain B as the links 6 pass around the front drum 1.

A belt 18 and strip 19 surrounds chain C and passes around a substantially arcuate shaped member 3' which surrounds the front drum 3 and is spaced therefrom to permit the chain to pass between the steel belt 18 and the drum 3, as shown in Fig. 1. As will be seen, the lower belt and strip which operate in conjunction with the lower chain rests in the bottom of the trough formed by the links of the chain, while the belt and strip which operate in conjunction with the upper chain engage the outer surface of the links of said chain. Transverse supporting plates 22 are carried by the rear end of the frame in front of the drums 21 for supporting the upper reaches of both the lower and upper sets of belts and strips.

A horizontal row of rollers 23 is provided for supporting the upper reach of the lower chain and a horizontal row of rollers 24 engages the links of the lower reach of the upper chain, these rollers 24 having their pintles rotatably arranged in the side bars 25 which, at the front end of the apparatus, are each provided with the pivoted sections 25' as shown in Figure 10, the pintles of some of these rollers 24 acting to pivot the sections to each other and to the main part of each side bar. Front and rear slotted brackets 26 are attached to the main frame and the pintles of the end roller 24 pass into slots 27 of these brackets as shown more particularly in Fig. 5, and this arrangement permits limited vertical movement of the bars 25 and the rollers 24.

A spring ram 28 shown in detail in Fig. 6, is supported from the main frame and engages the pivoted sections 25' of the side bars and tends to press said sections and the rollers carried thereby downwardly. As shown in Fig. 6 this ram includes a socketed lower part 29 which contacts the sections 25' and the socket of which receives the head 30 of a bolt 31 which passes through a nut 32 attached to the frame. A spring 33 is partly located in the socket and engages the nut 34 on the threaded part of the bolt so that the tension of the spring 33 can be adjusted as well as the distance between the base part 29 and that part of the main frame which carries the nut 32. By adjusting these parts of the spring ram the amount of pressure with which the front links of the lower reach of the upper chain engages the material can be regulated.

The hydraulic rams 35 engage the main parts of the bars 25, rollers 24 are mounted on these bars 25 and engage the upper surface of the links 12 of the lower reach of the chain C. This enables the pressure from the hydraulic rams 35 to be transmitted downward through chain C, perforated steel belt 18 and fibrous strip 19 thereby pressing the material disposed between said fibrous strip and the fibrous strip operating in conjunction with chain B. Each of these rams 35 comprises a cylinder 36 having a piston 37 therein, the piston rod 38 of which is formed of two parts adjustably connected together as shown in Fig. 7, with the lower end of the rod engaging the head 39 which rests on the bars 25, as shown more clearly in Fig. 3. Fluid under pressure is simultaneously introduced into the top parts of the cylinders 36 by the pipe line 40 so that the hydraulic rams will exert uniform pressure upon the parts. It is to be noted that the intermediate upright frame members (not numbered) carry cross members (not numbered) at their upper ends and which support rams 35. These upright frame members support longitudinal side members (not numbered) within off-set recesses of the intermediate upright frame members. This permits the hydraulic pressure exerted by the rams 35 to be transmitted through the upper cross member of the intermediate upright frame members, and the intermediate frame members to the longitudinal side frame member carrying the pintles of the lower rollers 23. In this manner the pressure exerted by the rams 35 is self contained within the intermediate upright frame members. Therefore the downward pressure exerted by the rams 35 on the rollers 23 tends to create a counteracting upward force on the material being pressed, equal to the downward pressure exerted.

Alternate rollers 23 of the lower row are driven from a shaft 41 having the worms 42 thereon engaging the worm gears 43 on the pintles of said alternate rollers and alternate rollers 24 of the upper row are driven from a shaft 44 having worms 45 thereon engaging the worm gears 46 on the pintles of said alternate rollers. The shaft 41 has a pulley 47 on one end thereof and the shaft 44 has a worm gear 44' thereon which meshes with worm 60 on a cross shaft 61 having a pulley 62 connected therewith, the pulleys 47 and 62 being belted to a suitable source of power. Thus the alternate rollers of the lower and upper rows 23 and 24 respectively will drive the two chains B and C and the belts 18 and the strips 19.

A hopper 48 is located at the front end of the machine and feeds the material to be pressed between the front ends of the upper reach of the lower chain and the lower reach of the upper chain, and, as will be seen in Fig. 1, the front drum 3 of the upper chain is so located that the front end of the lower reach of said chain is spaced from the upper reach of the lower chain so that the material can pass between the two chains, during which it is pressed between the two chains, the belts 18 and the strips 19, by the pressure exerted by the spring and hydraulic rams.

A distributor 49, consisting of a roll provided with paddles, is located in the hopper 48 and is driven by a belt and pulleys, shown generally at 50, from the front roller 23, as shown in Fig. 1, and blades 51 are located at the rear end of the machine for scraping the pressed material from the strips 19, as is also shown in Figure 1.

The side bars 7' of the links of the lower chain have pressure applied thereto, as said links travel from the upper part of the drum 1 to the upper part of the drum 2, by the vertically arranged rolls 52 carried by channel members 53 located at the sides of the main frame and slidably supported for horizontal movement by the studs 54 carried by the brackets 55 attached to parts of the main frame. Bolts 56 pass through threaded holes in parts of the main frame and engage the channel members 53 to press the rolls 52 against the side bars 7' of the links 6, as shown in Fig. 3. These rolls 52 hold the links of the upper reach of the lower chain and the lower reach of the upper chain in position for receiving and pressing the material to be pressed.

A moisture pan 57 is located under the upper reach of the lower chain for receiving moisture from the pressed material and this pan is provided with a depending discharge tube 58. I also provide a scraper 59 in the rear part of the hopper 48 which acts to evenly distribute the material passing from the hopper upon the front portion of the fibrous strip disposed upon the upper reach of the lower chain.

From the foregoing it will be seen that the material to be pressed between the chains is fed into the space therebetween from the hopper 48 and is conveyed from said inlet end to the opposite end of the belts 18—19 where it is discharged. During such travel, the pressure exerted on the material by the coacting rollers 23 and 24 which bear against the opposed runs of the conveyors exert sufficient pressure to squeeze out the juice which passes through the lower fabric belt and the registering openings in the metal belt 18 and conveyor chain B to pass into the receptacle 57 (Fig. 2). It will also be seen that the material is subjected to pressure first by the spring ram and then by the hydraulic rams and that the material is subjected to pressure for a considerable distance as it travels with the moving parts from the hopper to the discharge end of the device. The side rolls 52 engaging the sides of the trough forming links of the lower chain effectively hold the links of the two chains in proper pressing position.

It is thought from the foregoing description that the advantages and novel features of the invention will be readily apparent.

It is to be understood that changes may be made in the construction and in the combination and arrangement of the several parts, provided that such changes fall within the scope of the appended claims.

For instance, the hydraulic and spring presses can be replaced by air presses or the like, and instead of having the chains perforated, they may be imperforate, or the lower chain may be perforated, and the upper chain imperforate. Also, when desired the fabric and steel belts can be omitted. Also, the blade bearing links, shown in Figs. 16 and 17, can be used in the upper chains. When this is done they will act as drag links, forcing the material through the machine under pressure. When such links are used, the press cloth and steel belts are omitted from the upper chains.

The machine may be used for pressing fabrics, extracting oils from cotton and flax seeds and the like, and for pressing fruits and vegetables.

What is claimed is:

1. A pressing machine of the class described comprising upper and lower endless chains, drums for supporting the chains, the links of the lower chain being of substantially trough shape in cross section, means for feeding material into the trough of the upper reach of the lower chain at one end of the machine, the material discharging at the opposite end thereof, an endless perforated belt of metal, an endless fabric strip contacting the outer face of the belt, a set of these belts being provided with each chain with each belt engaging the outer faces of the links of each chain, a drum for each set spaced rearwardly of the rear chain drum, the front ends of the sets passing around the front chain drum with the links, the links of both sets of chains being perforated and the perforations registering with those of the belts, means for applying pressure to the lower reach of the upper chain and means for causing the chains to travel in their paths, said means including upper and lower horizontal rows of rollers, the lower row engaging the links of the upper reach of the lower chain and the upper row engaging the links of the lower reach of the upper chain and means for rotating some of the rollers of both rows, said means including worm gears engaging alternate rollers, with the undriven rolls of the upper row placed over the driven rolls of the lower row, said pressure means including hydraulic rams for pressing the major part of the upper row of rolls downwardly and a spring ram for pressing the front rolls of the top row downwardly, said top row being supported for vertical movement by side bars supported for vertical movement, the front parts of the side bars being formed in sections pivotally connected with the major parts of the side bars with the spring ram engaging said sections.

2. A pressing machine of the class described comprising upper and lower endless chains, drums for supporting the chains, the links of the lower chain being of substantially trough shape in cross section, means for feeding material into the trough of the upper reach of the lower chain at one end of the machine, the material discharging at the opposite end thereof, an endless perforated belt of metal, an endless fabric strip contacting the outer face of the belt, a set of these belts being provided with each chain with each belt engaging the outer faces of the links of each chain, a drum for each set spaced rearwardly of the rear chain drum, the front ends of the sets passing around the front chain drum with the links, the links of both sets of chains being perforated and the perforations registering with those of the belts, means for applying pressure to the lower reach of the upper chain and means for causing the chains to travel in their paths, said means including upper and lower horizontal rows of rollers, the lower row engaging the links of the upper reach of the lower chain and the upper row engaging the links of the lower reach of the upper chain and means for rotating some of the rollers of both rows, said means including worm gears engaging alternate rollers, with the undriven rolls of the upper row placed over the driven rolls of the lower row, said pressure means including hydraulic rams for pressing the major part of the upper row of rolls downwardly and a spring ram for pressing the front rolls of the top row downwardly, said top row being supported for vertical movement by side bars supported for vertical movement, the front parts of the side bars being formed in sections pivotally connected with the major parts of the side bars with the spring ram engaging said sections, and a pan located under the lower row of rolls for receiving moisture from the pressed material.

3. A pressing machine of the class described comprising upper and lower endless chains, drums for supporting the front and rear ends of the chains, the links of the lower chain being of substantially trough shape in cross-section, means for feeding material into the trough of the upper reach of the lower chain at one end of the machine, the material discharging at the opposite end thereof, an endless perforated belt, an endless non-metallic belt contacting the outer face of the perforated belt, a set of these belts being provided for each chain with a belt engaging the outer faces of the links of each chain, a drum for each set of belts spaced rearwardly of the rear chain drum, the front ends of the sets of belts passing around the front chain drums with the links, the links of both sets of chains being perforated and the perforations registering with those in the belts, means for applying pressure to the lower reach of the upper chain, and means for causing the chains to travel in their paths, said means including upper and lower horizontal rows of rollers, the lower row engaging the links of the upper reach of the lower chain and the upper row engaging the links of the lower reach of the upper chain, and means for rotating some of the rollers of both rows, said means including worm gears engaging alternate rollers with the undriven rollers of the upper row placed over the driven rollers of the lower row, said pressure means including hydraulic rams for pressing the major part of the upper row downwardly and a spring ram for pressing the front rollers of the top row downwardly, said top row being supported for vertical movement.

4. A pressing machine of the class described comprising upper and lower endless chains, drums for supporting the front and rear ends of the chains, the links of the lower chain being of substantially trough shape in cross section, means for feeding material into the trough of the upper reach of the lower chain at one end of the machine, the material discharging at the opposite end thereof, an endless perforated belt, an endless non-metallic belt contacting the outer face of the perforated belt, a set of these belts being provided for each chain with a belt engaging the outer faces of the links of each chain disconnected therefrom and in frictional contact therewith for movement by the chain, a drum for each set of belts spaced rearwardly of the rear chain drum, the front ends of the sets of belts passing around the front chain drums with the links, the links of both sets of chains being perforated and the perforations registering with those in the belts, means for applying pressure to the lower reach of the upper chain, and means for causing the chains to travel in their paths, said means including upper and lower horizontal rows of rollers, the lower row engaging the links of the upper reach of the lower chain and the upper row engaging the links of the lower reach of the upper chain, and means for rotating some of the rollers of both rows, said means including worm gears engaging alternate rollers with the undriven rollers of the upper row placed over the driven rollers of the lower row.

5. A pressing machine of the class described comprising upper and lower endless chains, drums for supporting the front and rear ends of the chains, the links of the lower chain being of substantially trough shape in cross section, means for feeding material into the trough of the upper reach of the lower chain at one end of the machine, the material discharging at the opposite end thereof, an endless perforated belt, an endless non-metallic belt contacting the outer face of the perforated belt, a set of these belts being provided for each chain with a belt engaging the outer faces of the links of each chain disconnected therefrom and in frictional contact therewith for movement by the chain, a drum for each set of belts spaced rearwardly of the rear chain drum, the front ends of the sets of belts passing around the front chain drums with the links, the links of both sets of chains being perforated and the perforations registering with those in the belts, means for applying pressure to the lower reach of the upper chains, and means for causing the chains to travel in their paths, said means including upper and lower horizontal rows of rollers, the lower row engaging the links of the upper reach of the lower chain and the upper row engaging the links of the lower reach of the upper chain, and means for rotating some of the rollers of both rows.

6. A pressing machine of the class described comprising upper and lower endless chains, drums for supporting the front and rear ends of the chains, the links of the lower chain being of substantially trough shape in cross-section, means for feeding material into the trough of the upper reach of the lower chain at one end of the machine, the material discharging at the opposite end thereof, an endless perforated belt, an endless non-metallic belt contacting the outer face of the perforated belt, a set of these belts being provided for each chain with a belt engaging the outer faces of the links of each chain disconnected therefrom and in frictional contact therewith for movement by the chain, a drum for each set of belts spaced rearwardly of the rear chain drum, the front ends of the sets of belts passing around the front chain drums with the links, the links of both sets of chains being perforated and the perforations registering with those in the belts, means for applying pressure to the lower reach of the upper chain, and means for causing the chains to travel in their paths 7. A pressing machine of the character described comprising upper and lower endless devices, means for supporting the front and rear ends thereof with adjacent reaches arranged to receive material therebetween at one end and to discharge said material adjacent the opposite end thereof, means for moving said endless devices comprising upper and lower rows of rollers bearing on the respective adjacent runs of the chains with said rollers having driving engagement with the chains, means for driving alternate rollers of said upper and lower runs of rollers with the driven roller of one row opposite an idle roller of the other row, and means for pressing said driving rollers inwardly.

8. A pressing machine of the character described comprising upper and lower endless devices, means for supporting the front and rear ends thereof with adjacent reaches arranged to receive material therebetween at one end and to discharge said material adjacent the opposite end thereof, means for moving said endless devices comprising upper and lower rows of rollers bearing on the respective adjacent runs of the chains with said rollers having driving engagement with the chains, means for mounting some of said rollers for bodily inward movement, means for applying inward pressure to said last-mentioned rollers, means for driving alternate rollers of the upper and lower runs of rollers with the driven roller of one row opposite an idle roller of the other row.

9. A pressing machine of the character described comprising upper and lower endless devices, means for supporting the front and rear ends thereof with adjacent reaches arranged to receive material therebetween at one end and to discharge said material adjacent the opposite end thereof, means for moving said endless devices, rows of upright rolls arranged along opposite sides of the endless devices for guiding the same therebetween, said upright rolls overlapping and bearing inwardly against opposite edges of the endless devices, and channels extending along opposite sides of the endless devices enclosing the upright rolls and journaling the same therein for turning movement about approximately vertical axes.

WILLIAM C. RICHARDSON.